United States Patent
Skuro

(10) Patent No.: US 7,159,978 B2
(45) Date of Patent: Jan. 9, 2007

(54) SPLIT TEMPLES FOR A RETRACTABLE EYEWEAR RESTRAINT STRAP

(76) Inventor: John Michael Skuro, 2033 Lone Pine Rd., Virginia Beach, VA (US) 23451

( * ) Notice: Subject to any disclaimer, the term of this patent is extended or adjusted under 35 U.S.C. 154(b) by 0 days.

(21) Appl. No.: 11/398,935

(22) Filed: Apr. 6, 2006

(65) Prior Publication Data

US 2006/0181674 A1   Aug. 17, 2006

Related U.S. Application Data

(63) Continuation-in-part of application No. 11/334,786, filed on Jan. 18, 2006, which is a continuation-in-part of application No. 10/807,891, filed on Mar. 24, 2004, now Pat. No. 6,905,206.

(60) Provisional application No. 60/668,580, filed on Apr. 6, 2005.

(51) Int. Cl.
    *G02C 5/20*      (2006.01)
(52) U.S. Cl. .................. 351/118; 351/111; 351/113; 351/117; 351/156
(58) Field of Classification Search ............... 351/118, 351/113, 117, 156, 111, 119, 157, 158, 41; 2/453

See application file for complete search history.

(56) References Cited

U.S. PATENT DOCUMENTS

| 4,479,703 | A  | * | 10/1984 | Enghofer | 351/123 |
| 5,790,228 | A  | * | 8/1998  | Bell, III | 351/118 |
| 6,547,388 | B1 | * | 4/2003  | Bohn     | 351/118 |
| 6,843,562 | B1 | * | 1/2005  | Ng       | 351/118 |
| 6,905,206 | B1 | * | 6/2005  | Skuro    | 351/118 |

* cited by examiner

*Primary Examiner*—Hung Xuan Dang
(74) *Attorney, Agent, or Firm*—John M. Brandt

(57) ABSTRACT

A temple construction arrangement for eyewear incorporating a retractable retaining strap in a hollow temple to form a part of and be attached to eyewear such as eye sight correction glasses, sunglasses, safety and protection goggles, and the like. The temple is separated or split lengthwise into two haves and a rotatable bearing, positioned transverse the length or longitudinal axis of the temple, is placed at the temple end attachable to the lens holding frame between the two halves. The retractable strap is disposed within and along the length of one side of the temple and, in combination with a longitudinal stretchable retracting member such as a spring or elastic cord, passes around the bearing. The attached retracting member is disposed along the length of the opposite side of the temple from that of the strap providing a retraction force for the retaining strap. The temple halves are then joined together to enclose the bearing, retaining strap, and retracting member as a finished unit.

1 Claim, 3 Drawing Sheets

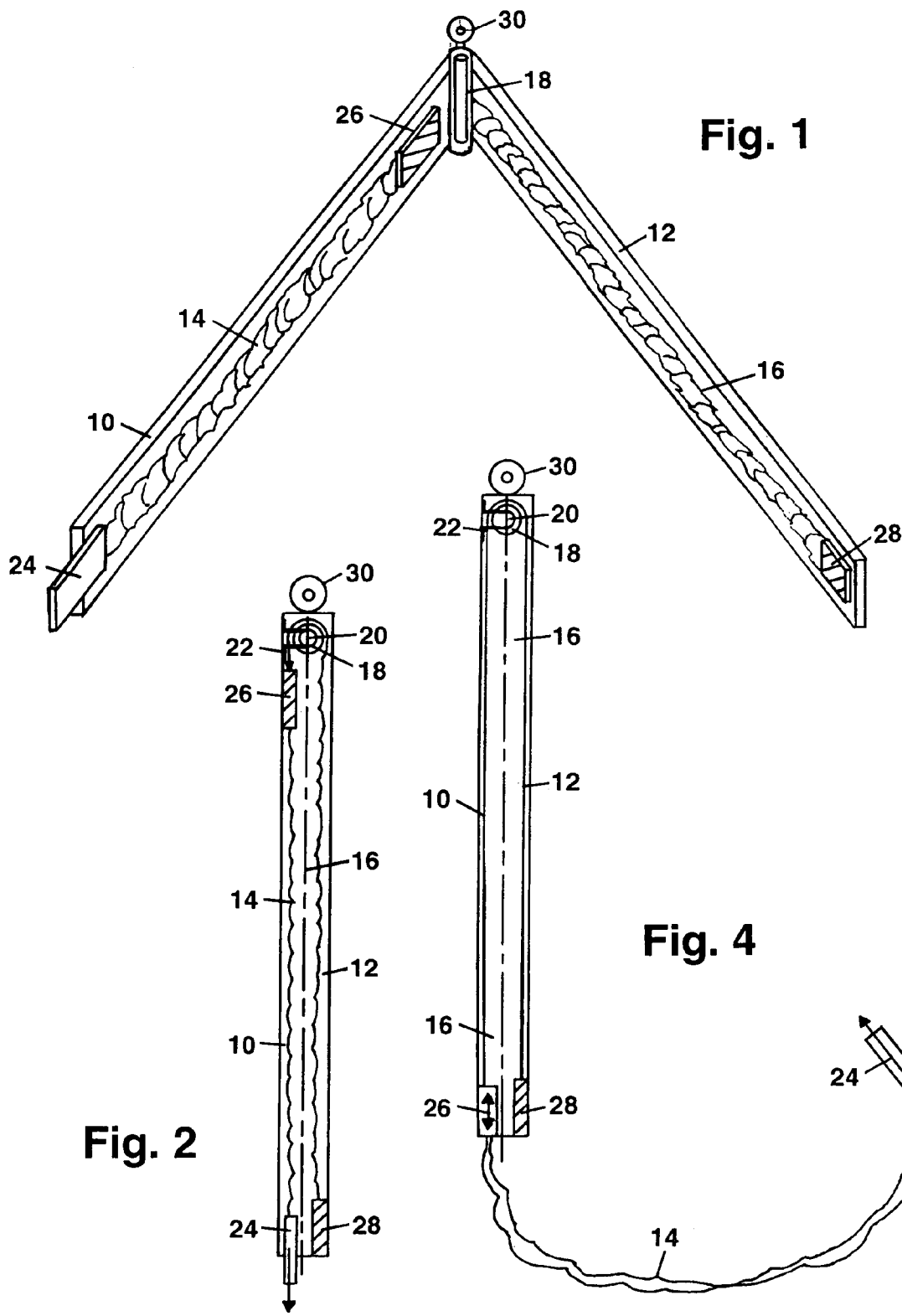

SPLIT TEMPLES FOR A RETRACTABLE EYEWEAR RESTRAINT STRAP

CROSS REFERENCE TO RELATED APPLICATIONS

This application is based on the disclosure of Provisional Application Ser. No. 60/668,580, filed Apr. 6, 2005, which is hereby incorporated by reference; and is a continuation in part of application Ser. No. 10/807,891, filed Mar. 24, 2004 now U.S. Pat. No. 6,905,206 and Ser. No. 11/334,786 filed Jan. 18, 2006 by the same inventor.

BACKGROUND OF THE INVENTION

1. Field of the Invention

The invention relates to devices for securing eyewear to the body of a wearer and more particularly relates to strap retracting arrangements and retaining straps disposed in eyewear temples for holding eyewear in place about the head or neck.

2. Description of the Prior Art

Retaining straps for eyewear or eyeglasses are well known in the prior art. Simple string type retainers having loops at each end to engage eyewear temples are readily available. These devices are usually inelastic and are designed to allow the eyewear to be worn about the neck when removed from the head. Elastic retainers are also sold for use in sports activities to keep the eyewear securely attached to the head. Both of the prior art types of elastic and inelastic retainers are separate units which remain external to the eyewear.

U.S. Pat. No. 4,479,703, Enghofer, discloses a retaining assembly wherein the retaining straps are elastic and retract of there own elasticity into hollow temples. U.S. Pat. No. 6,547,388, Bohn, provides a similar device wherein the retaining strap coils about itself and is adjustable as to effective length by various stop mechanisms.

The above cited U.S. Pat. No. 6,905,206, Skuro, provides a retractable assembly for both elastic and inelastic straps so that both an active mode, i.e., secured to the head, and passive mode, for example, around the neck, are available. Additionally, the design allows the straps to be completely retracted when neither form of use is desired.

The present invention improves upon the prior art by providing a vertical bearing disposed transverse the temple at the frame attachable end to provide an increase of the length of that portion of the strap and retracting member which act to retract the retaining strap within the temple. Further, the disposition and assembly of the components is facilitated by constructing the temple of two opposed longitudinal halves which are joined together after the inclusion of the bearing, retaining strap, and the stretchable retraction member.

SUMMARY OF THE INVENTION

The invention may be summarized as an improved retracting arrangement for a retractable retaining strap for head worn eyewear. By eyewear is meant any framelike device which contains, holds, or supports transparent, clear, colored, and/or corrective lens structures, which frame is supported on the head by the use of temples that fit over the ears. Items such as sunglasses, sight correcting eyeglasses, and safety glasses are all included in the class of eyewear for which the invention is appropriate.

As is known in the prior art, the retaining strap retracting mechanism is used in conjunction with a hollow temple in which the strap is disposed. The retracting mechanism increases the force and efficiency by which the strap is withdrawn into the temple when not extended for use. In the present invention, the temple is split lengthwise and a rotatable bearing or cylinder is positioned at the temple end attachable to the lens holding frame between the temple halves. The extendable retaining strap is disposed on, i.e., in one side of the hollow temple and a stretchable retracting member such as a spring or flexible cord in the other. Both strap and retracting member are connected and wrap around the bearing. As will be seen, the point of connection is not critical and will depend upon the length of retaining strap desired as well as the amount or length of stretchable retracting member required.

The invention may be advantageously used in association with the sliding block arrangement disclosed in the above referenced U.S. Pat. No. 6,905,206, Skuro, and will be illustrated in conjunction with that system.

These, and other features and advantages of the invention will become more evident from the description of the preferred embodiment accompanied by the drawings which follows.

DESCRIPTION OF THE DRAWINGS

FIG. 1 is a perspective view of the preferred embodiment of the invention;

FIG. 2 is a cross-sectional top view of the embodiment of FIG. 1;

FIG. 4 is a cross-sectional top view of the embodiment of FIG. 3; and

DESCRIPTION OF THE PREFERRED EMBODIMENT

Figure 3:
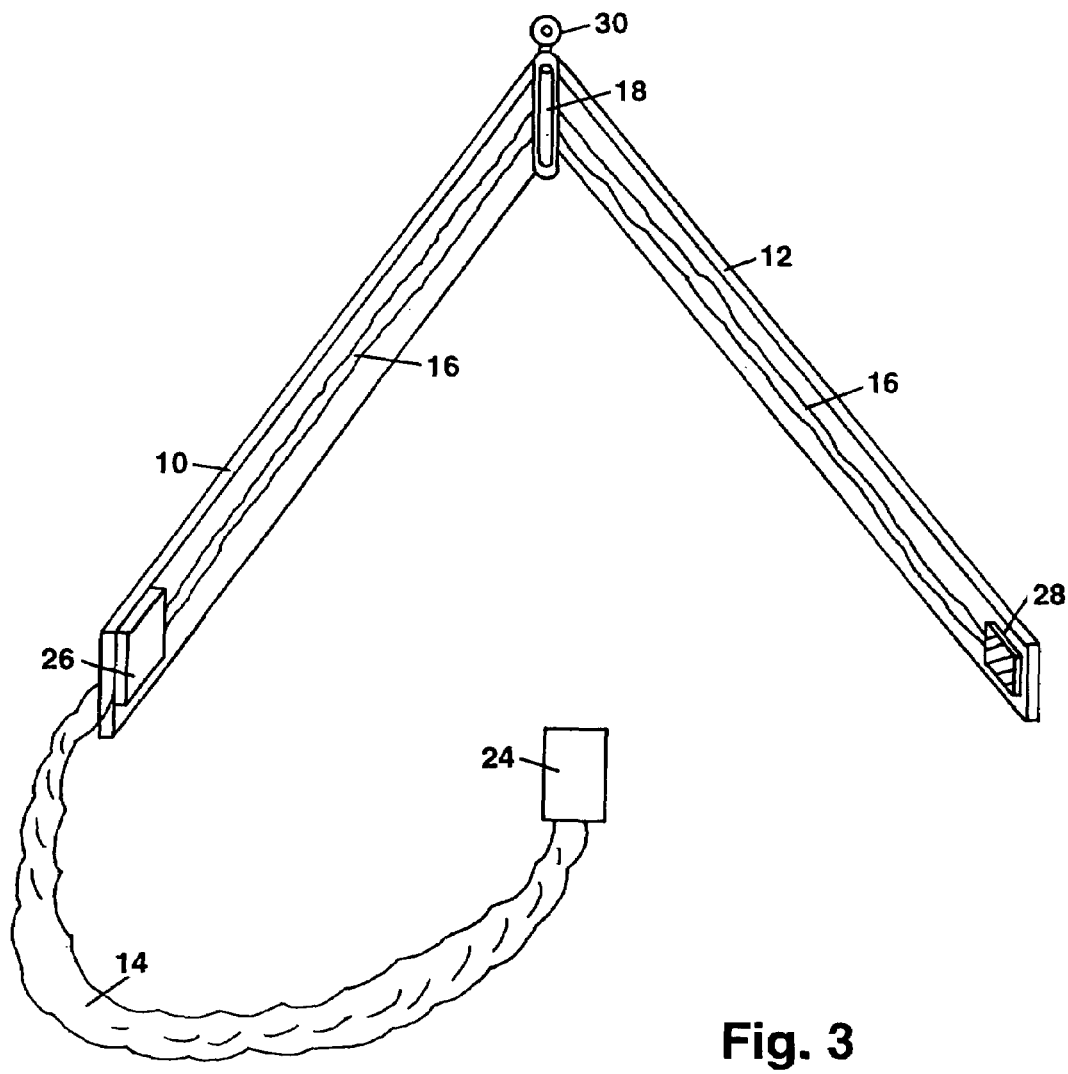
FIG. 3 is an additional perspective view of the preferred embodiment of the invention.

Referring first to FIG. 1, a perspective view of the preferred embodiment of the invention is illustrated in which the eyewear temple of the invention is composed of two hollow halves 10 and 12 which will be joined together to form a complete temple as shown in FIG. 2. Eyewear retaining strap 14 is disposed in temple half 10 and strap retracting member 16 in temple half 12. Retracting member 16 is a stretchable elastic cord, coil spring, heavy duty rubber band, or the like having sufficient elasticity to hold strap 14 within the temple when not withdrawn.

Rotatable bearing 18 is positioned at the eyewear frame attachable end of the temple and may consist of a cylinder on an axel 20, the axel being held by, for example, one or more staples 22 as illustrated in FIG. 2. Block 24 is attached to strap 14 at the strap receiving end of the temple and is held in place or released by means not shown but as are fully described in the above referenced U.S. Pat. No. 6,905,206 to applicant. Block 24 also will serve to secure the restraint strap when extended to the eyewear, either the opposite temple or the frame itself also as is detailed in the above cited patent. Block 26 provides a point of attachment between strap 14 and retracting member 16 and is arranged to slide within the temple. Block 26 is similarly held in place or released by the above referenced means and is further arranged to lock in place at the strap receiving end of the temple as shown in FIGS. 3 and 4 again by means detailed in the previously cited patent.

Retracting member 16 is fastened at the strap receiving end of temple half 12 by, for example, an anchor block 28 and extends around bearing 18 to connect to strap 14. The point of attachment may vary depending on the length and composition of the strap and retaining member and may lie on other side of bearing 18 as long as the assembly is free to move past the bearing at the connection if on the retaining member side.

FIG. 2 is a top view of FIG. 1 showing the two temple halves joined together to form a completed unit and the location of hinge 30 for joining frame and temple. FIG. 3 shows retaining strap 14 withdrawn and retracting member 16 extended in a spread apart temple for purposes of illustration. FIG. 4 is a top view of FIG. 3 further illustrating the various components of the invention in extended condition.

Figure 5C:
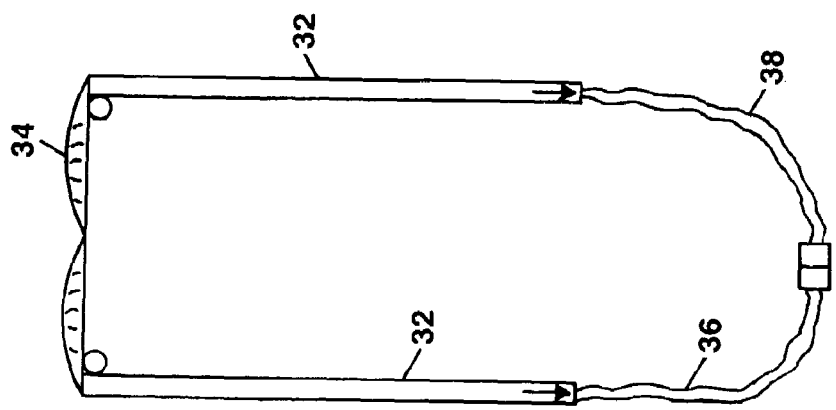
FIGS. 5A, B, and C are schematic views of the preferred embodiment of the invention in various conditions of use.
Figure 5B:
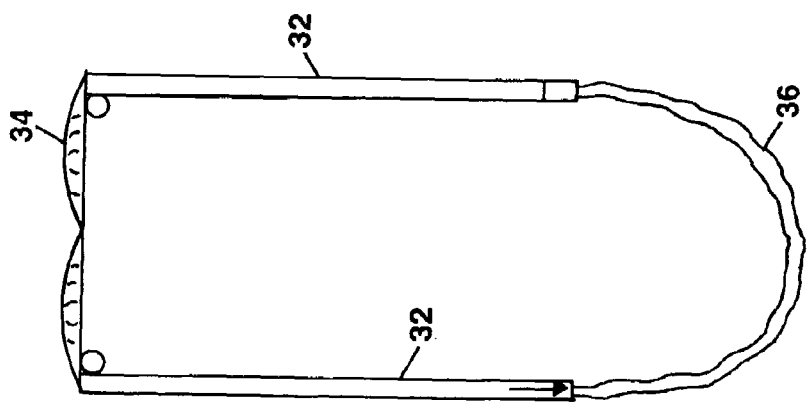
Figure 5A:
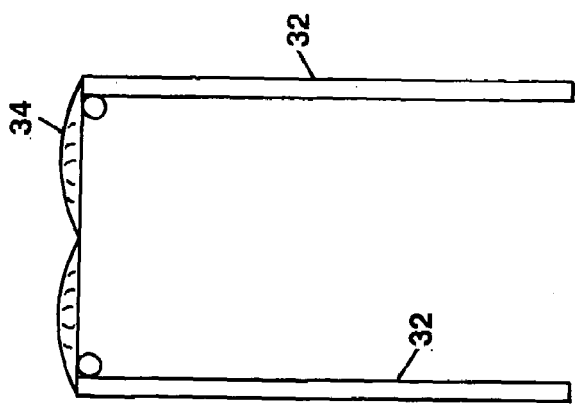

FIGS. 5A–C are provided to show the use of the completed invention employing both an elastic and an in elastic retaining strap combination. In FIG. 5A, retaining straps are retracted into temples 32 of the invention attached to eyewear 34. FIG. 5B shows a first strap 36 extended which strap may be either elastic or inelastic, and fastened to the opposite temple strap receiving end. FIG. 5C further illustrates the extension of another strap 38 disposed in the opposite temple which strap may again be either elastic or inelastic and fastened to the first strap.

Elastic straps facilitate the retention of the eyewear on the head and inelastic straps the retention of the eyewear about the neck.

As variations in the above described preferred embodiment may be made within the general concept of the disclosure, the invention is accordingly defined by the following claims.

What is claimed is:

1. A retractable eyewear retaining strap assembly for an eyewear frame comprising in combination:
   A. a hollow temple having a strap receiving end and an eyewear frame attachable end hingeably attachable to said frame, said temple composed of two hollow halves separated lengthwise along the longitudinal axis of said temple;
   B. a rotatable bearing mounted within said temple between said temple halves at said frame attachable end positioned transverse the longitudinal axis of said temple;
   C. a longitudinal eyewear retaining strap disposed within one of said halves of said hollow temple, said strap withdrawable from said hollow temple at said strap receiving end;
   D. a longitudinal stretchable retracting member connected to said strap and disposed within the opposite of said hollow halves from that of said retaining strap, said member connected to said temple at said strap receiving end, said strap and said stretchable member arranged in combination to pass around said bearing at said frame attachable end; and
   E. fastening means attached to said eyewear retaining strap, said fastening means attachable to said eyewear.

* * * * *